June 19, 1923.
C. BLACKWELL
1,458,971
METAL CASING WHEEL
Filed March 25, 1922
2 Sheets-Sheet 1
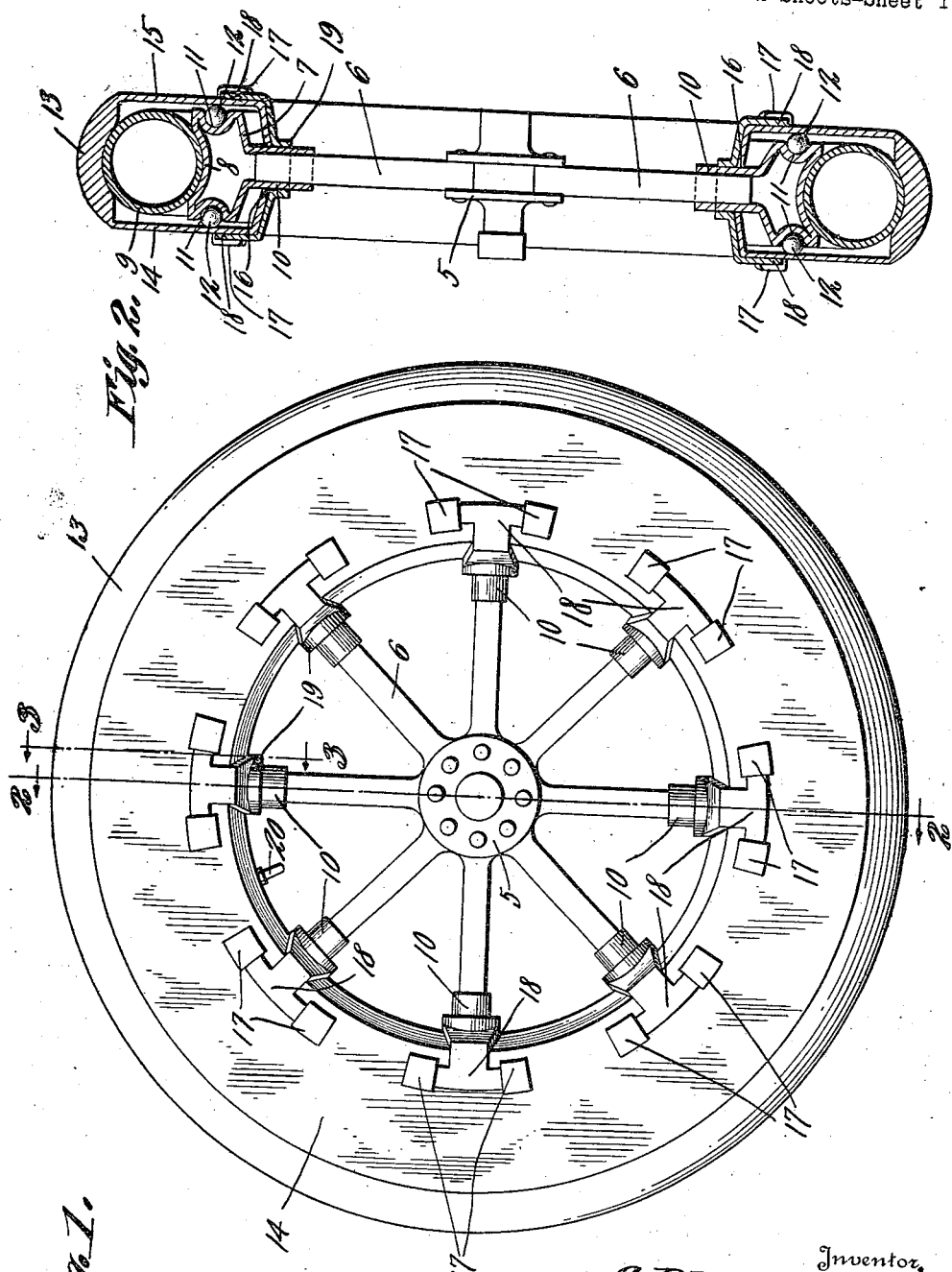
Inventor,
C. Blackwell.

June 19, 1923.
C. BLACKWELL
1,458,971
METAL CASING WHEEL
Filed March 25, 1922
2 Sheets-Sheet 2
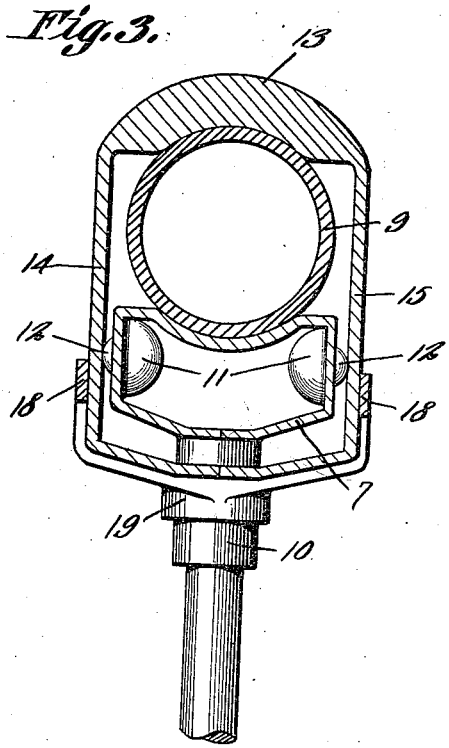
Fig. 3.
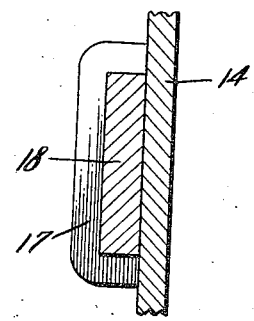
Fig. 4.
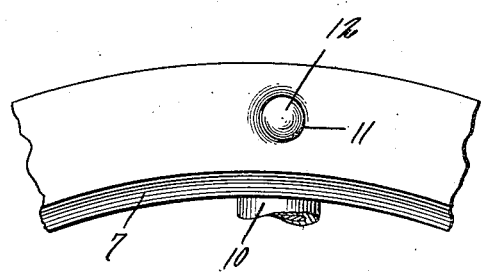
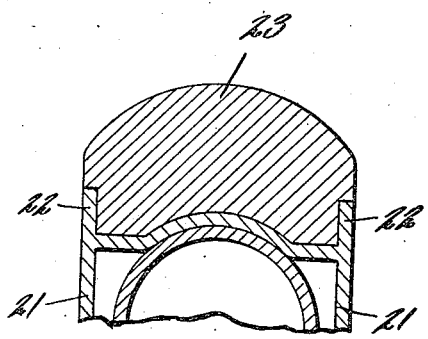
Fig. 6.
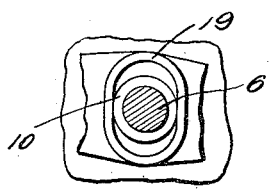
Fig. 5.
Fig. 7.
Inventor,
C. Blackwell,
By Chas Lee
Attorney Patented June 19, 1923.

1,458,971

UNITED STATES PATENT OFFICE.

CHARLES BLACKWELL, OF ST. LOUIS, MISSOURI.

METAL-CASING WHEEL.

Application filed March 25, 1922. Serial No. 546,753.

*To all whom it may concern:*

Be it known that I, CHARLES BLACKWELL, a citizen of the United States, residing at St. Louis, in the State of Missouri, have invented a new and useful Metal-Casing Wheel, of which the following is a specification.

This invention relates to wheel constructions, the primary object of the invention being to provide a wheel possessing resilient qualities equal to the usual wheel supplied with a pneumatic tire, due consideration being given to the construction of the wheel to lend strength and durability thereto.

Another object of the invention is to provide a wheel of this character including a pneumatic tube, the tube being positioned within the wheel in a manner to protect the same against puncture.

A still further object of the invention is the provision of anti-friction means disposed between the movable elements of the wheel, to insure the true operation of the elements of the wheel.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a side elevational view of a wheel constructed in accordance with the present invention.

Figure 2 is a sectional view taken on line 2—2 of Figure 1.

Figure 3 is a sectional view taken on line 3—3 of Figure 1.

Figure 4 is a fragmental sectional view through one of the flanges of the wheel and disclosing one of the arms in its keeper.

Figure 5 is a fragmental detail view of one portion of the wheel.

Figure 6 is a fragmental sectional view through a modified form of the invention.

Figure 7 is a fragmental sectional view taken through one of the spokes and disclosing the construction of the spoke openings.

Referring to the drawings in detail, the reference character 5 designates the hub of the wheel to which are secured the spokes 6 that are shown as radiating therefrom.

The felloe of the wheel is indicated at 7, and is formed preferably of sheet metal, and constructed to provide an outer wall 8 which is curved as clearly shown by Figure 2 of the drawings, to provide a seat for the pneumatic tube 9. This felloe 7 has integral socket members 10 designed to accommodate the outer ends of the spokes 6, suitable means being provided for securing the spokes to the felloe.

Formed in the side walls of the felloe 7, are circular depressions providing pockets 11 to accommodate the balls 12, the pockets being arranged in circular spaced relation with each other. The ground engaging portion of the wheel embodies a tread portion 13 having inwardly extending lateral flanges 14 and 15 respectively, the inner ends thereof being formed with openings 16, which openings accommodate the socket members 10, the openings being slightly larger than the socket members 10 to permit of movement of the spokes and socket members, when the wheel encounters an obstruction in the road surface over which the same is passing.

Secured to the outer surfaces of the flanges 14 and 15 and disposed in pairs, are the keepers 17 that accommodate the arms 18 formed on the collars 19 that are carried by the spokes 6. Thus it will be seen that movement of the hub with respect to the tread or outer portion of the wheel will be permitted.

It might be further stated that due to this construction, the tube 9, which is inflated through the valve 20, receives the shocks of the road.

In the form of the invention as illustrated by Figure 6 of the drawings, the wheel is constructed in substantially the same manner as that shown by the remaining figures of the drawings, except that the flanges 21 are formed with extensions 22 to receive the reduced portion of the solid or cushion tire 23.

Having thus described the invention, what is claimed as new is:—

In a resilient wheel construction, a hub, spokes radiating from the hub, a hollow felloe connecting the spokes, said hollow felloe having depressions formed in the side walls thereof, balls positioned within the depressions, said felloe having a curved portion providing a seat, a ground engaging section including lateral flanges, said balls adapted to contact with the lateral flanges to permit of movement of the felloe within the ground engaging section, a pneumatic tube disposed within the ground engaging section and resting in the seat formed in the felloe, collars positioned on the spokes, said collars having integral arms embracing portions of the ground engaging section, and means for connecting the arms to the ground engaging section to restrict rotary movement of the ground engaging section with respect to its spokes.

In testimony that I claim the foregoing as my own, I have hereto affixed my signature in the presence of two witnesses.

CHARLES BLACKWELL.

Witnesses:
EDW. L. HOHENSTEIN,
LENA PARKER.